United States Patent [19]

Thyret et al.

[11] 4,298,576
[45] Nov. 3, 1981

[54] POLYMERIZATION AUTOCLAVE

[75] Inventors: Helmut Thyret; Thomas Balwé; Josef Hanzalik; Herbert Fürst; Johann Bauer, all of Burghausen, Fed. Rep. of Germany

[73] Assignee: Wacker-Chemie GmbH, Munich, Fed. Rep. of Germany

[21] Appl. No.: 97,708

[22] Filed: Nov. 27, 1979

[30] Foreign Application Priority Data

Dec. 5, 1978 [DE] Fed. Rep. of Germany ....... 2852622

[51] Int. Cl.³ ...................... C08F 114/08; B01J 19/18
[52] U.S. Cl. ................................. 422/135; 422/138; 422/202; 422/225; 526/920
[58] Field of Search ............................... 422/131–138, 422/202, 225; 366/306; 526/920

[56] References Cited

U.S. PATENT DOCUMENTS

| | | | |
|---|---|---|---|
| 3,334,870 | 8/1967 | Knopp et al. | 366/306 |
| 3,749,555 | 7/1973 | Beckmann et al. | 422/135 |
| 3,842,055 | 10/1974 | Gabriel et al. | 422/135 |
| 4,050,901 | 9/1977 | Pfeiffer et al. | 422/138 |
| 4,125,697 | 11/1978 | Pettelkau et al. | 422/135 |
| 4,198,376 | 4/1980 | Fournel et al. | 422/135 |

FOREIGN PATENT DOCUMENTS 43-18555  9/1968  Japan ................................. 422/135

Primary Examiner—Michael S. Marcus
Attorney, Agent, or Firm—Hammond & Littell, Weissenberger and Muserlian

[57] ABSTRACT

A polymerization autoclave for the suspension polymerization of vinyl compounds in the aqueous phase having a volume of from 50 to 200 m³, an impeller agitator driven from below at the bottom of the autoclave and two cylindrical displacement bodies acting as flow interrupters, secured downwardly from the autoclave dome, where the autoclave has a height-to-diameter ratio of from 2.4 to 3 with a critically dimensioned agitator and critically dimensioned flow interrupter fittings. By the use of this invention in the case large-scale autoclaves, the heat of polymerization can be removed merely by wall-cooling. The autoclave according to the invention are very economical, as shown by, for example, a spatial capacity of 0.3 to 0.4 metric tons of polyvinyl chloride per m³ autoclave volume.

2 Claims, 2 Drawing Figures

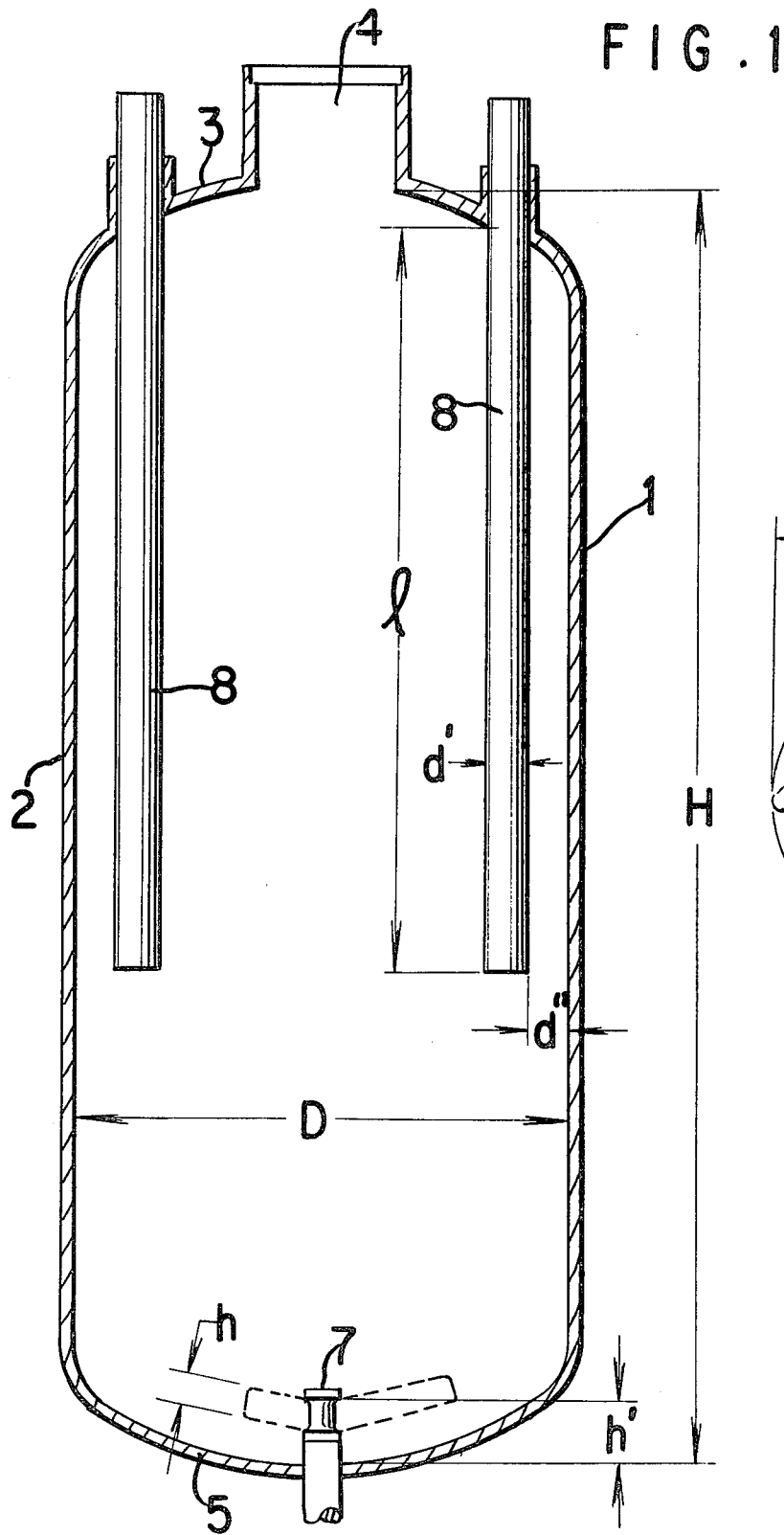
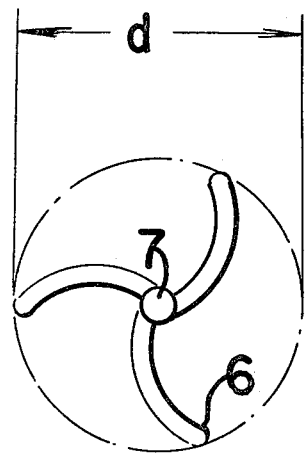
FIG. 1
FIG. 2

POLYMERIZATION AUTOCLAVE

BACKGROUND OF THE INVENTION

The invention relates to a large-scale autoclave for the polymerization of vinyl compounds in aqueous suspension. According to present usage, a large-scale autoclave is understood as meaning an autoclave having a volume of more than 50 m³ (13,200 gallons).

The polymerization of vinyl compounds in aqueous suspension is carried out by dispersing the monomeric vinyl compounds, which are optionally present under pressure in the liquid phase, by intensive agitation in the continuous aqueous phase, the dispersed phase being stabilized by the presence of a protective colloid. Polymerization is started by monomer-soluble initiators that decompose at an elevated temperature to form free-radicals and the resulting heat of polymerization must be removed.

Especially in the case of polymerization of vinyl chloride according to the suspension process, the trend is to use relatively large polymerization units. Thus, for example, a large-scale autoclave having a volume of 200 m³ has been described (*Hydrocarbon Processing*, Nov. 1976, pages 177 ff.). The use of large polymerization units has economic as well as technical advantages. One of the economic advantages is the low investment cost since only one set of autoclave auxiliary equipment, for example, vents, fixtures, lines, controls, etc., is needed in contrast to the case of a relatively large number of smaller units. Likewise, the smaller number of operating personnel required is also of economic advantage. One of the technical advantages is the improved consistency of the quality of the products and another is, for example, the lower speck-content of the polymers.

Because of the relatively unfavorable surface-to-volume ratio, the removal of the heat of polymerization in the case of large-scale autoclaves is less efficient. It has generally been observed that the removal of the heat of polymerization through the autoclave wall alone is not sufficient, especially if production conditions are to be economical, that is high polymerization rates and high spatial capacity, with a high monomer:-water ratio.

The use of a reflux condenser may be helpful in this case. In the case of polymerization batches that form a large amount of foam, however, the condenser becomes coated very rapidly and becomes ineffective as a result. If the danger of insufficient heat removal is to be avoided in this case, the condenser must be cleaned frequently during the course of repeated polymerizations. The condensate flowing back into the autoclave can also lead to problems (*Chemtech*. May 73, page 308). Finally, when operating a completely full autoclave, the use of a reflux condenser is not possible.

The final paragraph of page 2 of German published application DE-OS No. 2,032,700 indicates that, in large-scale autoclaves, wall-cooling alone is not sufficient to remove the heat of polymerization. It is also stated that agitation in narrow autoclaves is not sufficiently effective in all parts of the autoclave.

OBJECTS OF THE INVENTION

An object of the present invention is to provide a large-scale autoclave which permits all the heat of polymerization to be removed via the shell, while nevertheless preserving economical operating conditions.

Another object of the present invention is to provide a polymerization autoclave for the suspension polymerization of vinyl compounds in the aqueous phase to form homopolymers and copolymers said autoclave having a substantially cylindrical wall with a slightly dished dome and bottom and having a volume of from 50 to 200 m³, a impeller agitator mounted on a shaft extending from the bottom of said autoclave and driven from below and two cylindrical displacement bodies suspended from said dome and acting as flow interrupters, consisting in that said autoclave has a height-to-diameter ratio of from 2.4 to 3 and satisfies the following ratios:

$d/D = 0.45$ to $0.55$
$h/d = 0.15$ to $0.18$
$h/H = 0.025$ to $0.045$
$l/H = 0.30$ to $0.65$
$d'/l = 0.08$ to $0.10$
$d''/d' = 0.8$ to $1.2$
$h'/h = 1.5$ to $2.5$ wherein
H = the height of said autoclave
D = the diameter of said autoclave
d = the diameter of the impeller agitator
h' = the distance from the top of the impeller blade at the impeller shaft to the bottom of said autoclave
h = the height of the impeller blade
l = the length of the said displacement body
d' = the diameter of said displacement body
d'' = the distance of said displacement body from the cylindrical wall of said autoclave These and other objects of the invention will become more apparent as the description thereof proceeds.

THE DRAWINGS

FIG. 1 is a schematic vertical cross-sectional view of the autoclave of the invention.

FIG. 2 is a plane view from the top of the impeller agitator.

DESCRIPTION OF THE INVENTION

The subject of the invention is a polymerization autoclave for the suspension polymerization of vinyl compounds in the aqueous phase, which autoclave is substantially cylindrical and which has a volume of from 50 to 200 m³, preferably from 70 to 125 m³, an impeller agitator driven from below and two cylindrical displacement bodies that act as flow interrupters and are secured from the dome of the autoclave, characterized in that the autoclave has a H/D ratio of from 2.4 to 3, preferably from 2.5 to 2.7, and in addition, satisfies the following conditions:

$d/D = 0.45$ to $0.55$, preferably $0.5$ to $0.53$
$h/d = 0.15$ to $0.18$, preferably $0.16$ to $0.17$
$h/H = 0.025$ to $0.045$, preferably $0.03$ to $0.04$
$l/H = 0.30$ to $0.65$, preferably $0.35$ to $0.45$
$d'/l = 0.08$ to $0.10$, preferably $0.085$ to $0.095$
$d''/d' = 0.8$ to $1.2$, preferably $0.9$ to $1.1$
$h'/h = 1.5$ to $2.5$, preferably $1.7$ to $2.0$ in which
H = the height of the autoclave
D = the diameter of the autoclave
d = the diameter of the impeller agitator
h' = the distance from the top of the impeller blade at the impeller shaft to the bottom of the autoclave
h = the height of the impeller blade
l = the length of the displacement body
d' = the diameter of the displacement body d″ = the distance of the displacement body from the autoclave wall More particularly, the present invention is directed to a polymerization autoclave for the suspension polymerization of vinyl compounds in the aqueous phase to form homopolymers and copolymers said autoclave having a substantially cylindrical wall with a slightly dished dome and bottom and having a volume of from 50 to 200 m$^3$, a impeller agitator mounted on a shaft extending from the bottom of said autoclave and driven from below and two cylindrical displacement bodies suspended from said dome and acting as flow interrupters, consisting in that said autoclave has a height-to-diameter ratio of from 2.4 to 3 and satisfies the following ratios:

d/D = 0.45 to 0.55
h/d = 0.15 to 0.18
h/H = 0.025 to 0.045
l/H = 0.30 to 0.65
d′/l = 0.08 to 0.10
d″/d′ = 0.8 to 1.2
h′/h = 1.5 to 2.5 wherein

H = the height of said autoclave D = the diameter of said autoclave d = the diameter of the impeller agitator
h′ = the distance from the top of the impeller blade at the impeller shaft to the bottom of said autoclave
h = the height of the impeller blade
l = the length of said displacement body
d′ = the diameter of said displacement body
d″ = the distance of said displacement body from the cylindrical wall of said autoclave.

Surprisingly, it has now been found that, even at a H/D ratio of the autoclave of over 2.4 to 3.0, it is possible to obtain, with the same spatial capacity, (metric tons of monomer/m$^3$ autoclave space) a vinyl polymer of the same quality as in the case of H/D ratios of from 1 to 2.2, which have previously been considered more favorable, and in the case of the invention the heat of polymerization can be removed completely via the shell. Because of the autoclave fittings according to the invention it is possible to achieve a sufficient agitation effect even in the parts of large-scale autoclaves which are some distance from the agitator.

In order to illustrate the invention, a large-scale autoclave according to the invention is described in more detail below, with reference to FIGS. 1 and 2.

The autoclave 1 has a jacket, not shown, a substantially cylindrical wall 2, a slightly dished dome 3 with a central opening 4 and a slightly dished bottom 5. An impeller agitator consisting of impeller blades 6 mounted on an impeller shaft 7 extends from the bottom of the autoclave 1. Two cylindrical displacement bodies 8 are suspended from the dome 3 and act as flow interrupters. The drawings also give the various dimensions H, D, d, h′, l, d′ and d″.

An autoclave meeting the critical dimensions of the present invention has, for example, a volume of 78 m$^3$ and a H/D ratio of 2.59. The relative dimensions of the agitating members are as follows:

d/D = 0.52
h/d = 0.167
h/H = 0.034
l/H = 0.38
d′/l = 0.09,
d″/d′ = 1.0
h′/h = 2.0 the letters having the meanings already mentioned. The autoclave according to the invention has, of course, the customary rounded or convex base and top curvature.

The relative dimensions according to the invention of the agitating members are crucial. Outside the given ranges, the polymerization conditions become rapidly unfavorable.

If, for example, the displacement bodies are lengthened to beyond the given range, or if additional displacement bodies of this type are provided, the mixing in the autoclave is impaired, the upper parts of the suspension being moved to a lesser extent. This then results in undesirable large polymer particles (coarse grained), which constitutes reduced quality. In a particularly unfavorable case, lumps and polymer bridges may even be formed. It is possible to avoid these phenomena to a limited extent by reducing the monomer:water ratio but this is economically disadvantageous.

Conversely, if the displacement bodies are shortened, the effect of the flow interrupters is reduced. Agitation is then carried out rather by rotation of the material, i.e. agitation is less effective and there is a danger that the area of turbulent flow will tend to become laminar. The result of this in practice is that there is a great difference between the power consumption of the agitator at the beginning of polymerization and at the end of polymerization: it increases very steeply towards the end of polymerization. If the width of the impeller blade is too small, agitation is insufficient in this case too, even at high speeds, and the result of this is that the monomer:water ratio must be lower to achieve the same product quality. Otherwise, agglomerates would be formed in this case as well, which could increase to form polymer bridges. On the other hand, a relatively wide impeller blade would also yield unfavorable ratios.

By using the large-scale autoclave according to the invention for polymerization, it is possible to effect polymerization with a high spatial capacity. A high spatial capacity means a large monomer input i.e. a high monomer:water ratio. Normal ratios are 0.5 to 0.75 in the polymerization of, for example, vinyl chloride.

According, the spatial capacity is between 0.3 and 0.4 metric ton (t) to polyvinyl chloride/m$^3$ autoclave volume. The following Example 1 shows that, despite the high H/D ratio, polymerization can be effected at a spatial capacity of 0.4 t of vinyl chloride/m$^3$ autoclave volume.

Polymerization in large-scale autoclaves can be employed especially in the homopolymerization of vinyl chloride under suspension polymerization conditions. In addition to homopolymerization, however, copolymers may also be produced using ethylenically unsaturated copolymerizable monomers in which the copolymers portion derived from the vinyl chloride is over 60% by weight. Copolymerization monomers are, for example, monomers, such as styrene, substituted styrenes, acryl monomers and substituted acryl monomers, vinyl esters with alkanoic acids having from 1 to 18 carbon atoms, vinyl halides having from 1 to 3 halogen atoms and unsaturated carboxylic acids, such as maleic acid and fumaric acid.

The following examples are illustrative of the practice of the invention without being limitative in any respect.

EXAMPLE 1

An autoclave was employed having a volume of 78 m$^3$ and an H/D ratio of 2.59, the relative dimensions of the agitating members being:

d/D=0.52
h'/d=0.167
h/H=0.034
l/H=0.38
d'/l=0.09,
d"/d'=1.2
h'/h=2.0

The following mixture was charged into the autoclave and polymerized:

28,600 kg of water
31,000 kg of vinyl chloride
18.9 kg of hydroxyethyl cellulose
4.5 kg of aminooethyl-hydroxypropyl cellulose
3.5 kg of sorbitan monostearate
6.0 kg of sulfuric acid
0.06 kg of sodium nitrite
15.7 kg of dicetyl peroxydicarbonate During polymerization, 850 l/h of water were metered in. The polymerization time was 9.0 hours. The agitator was employed at 117 rev/min. The polymerization temperature was maintained at 54° C. The product had a bulk density of 0.662 g cm$^{-3}$ and a compacted bulk density of 0.746 g cm$^{-3}$, the parameters of the particle size distribution according to Rosin-Rammler were d'=0.17 mm and n=6.2. The characteristic data thus correspond exactly to the values obtained when an analogous mixture is processed in a 25 m$^3$ autoclave having an H/D ratio of 1.77.

EXAMPLE 2

In an autoclave as in Example 1, the following polymerization mixture was processed:

37,000 kg of water
25,000 kg of vinyl chloride
7.5 kg of methyl-hydroxypropyl cellulose
2.385 kg of di(2-ethylhexyl) peroxydicarbonate
4.762 kg of t-butyl peroxypivalate The polymerization temperature was maintained at 71° C. During polymerization, 900 l/h of water were metered in. The polymerization time was 4.5 h and the rate of stirring was 117 rpm.

This example demonstrates that, using the autoclave according to the invention, polymerization times can be achieved which are equivalent to those achieved when using a reflux condenser.

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. A polymerization autoclave for the suspension polymerization of vinyl compounds in the aqueous phase to form vinyl chloride homopolymers and copolymers of over 60% by weight of vinyl chloride and the remainder ethylenically unsaturated monomers copolymerizable with vinyl chloride, said autoclave having a substantially cylindrical wall with a slightly dished dome and bottom and having a volume of from 70 to 125 m$^3$, heat exchange jacket means attached to the autoclave and being the sole means of heat exchange, an impeller agitator mounted on a shaft extending from the bottom of said autoclave and driven from below and two cylindrical displacement bodies suspended from said dome and acting as flow interrupters, consisting in that said autoclave has a height-to-diameter ratio of from 2.5 to 2.7 and satisfies the following ratios:

d/D=0.5 to 0.53
h/d=0.16 to 0.17
h/H=0.03 to 0.04
l/H=0.35 to 0.45
d'/l=0.085 to 0.095
d"/d"=0.9 to 1.1
h'/h=1.7 to 2.0 wherein
H=the height of said autoclave
D=the diameter of said autoclave
d=the diameter of the impeller agitator
h'=the distance from the top of the impeller blade at the impeller shaft to the bottom of said autoclave
h=the height of the impeller blade
l=the length of said displacement body
d'=the diameter of said displacement body
d"=the distance of said displacement body from the cylindrical wall of said autoclave.

2. The polymerization autoclave of claim 1 having a volume of 78 cm$^3$, wherein the height-to-diameter ratio is 2.59 and satisfies the following ratios:

d/D=0.52
h/d=0.167
h/H=0.034
l/H=0.38
d'/l=0.09
d"/d'=1.0
h'/h=2.0.

* * * * *